United States Patent
Reznor et al.

(10) Patent No.: US 9,552,418 B2
(45) Date of Patent: Jan. 24, 2017

(54) SYSTEMS AND METHODS FOR DISTRIBUTING A PLAYLIST WITHIN A MUSIC SERVICE

(71) Applicant: Beats Music, LLC, San Francisco, CA (US)

(72) Inventors: Michael Trent Reznor, Beverly Hills, CA (US); Rob Sheridan, Los Angeles, CA (US); Joel Brosjo, Stockholm (SE); Fredric Vinna, Stockholm (SE); Brian Frank, Sherman Oaks, CA (US); Ola Sars, Stockholm (SE)

(73) Assignee: Apple Inc., Cupertino, CA (US)

( * ) Notice: Subject to any disclaimer, the term of this patent is extended or adjusted under 35 U.S.C. 154(b) by 197 days.

(21) Appl. No.: 13/657,739

(22) Filed: Oct. 22, 2012

(65) Prior Publication Data
US 2014/0115462 A1    Apr. 24, 2014

(51) Int. Cl.
G06F 17/30 (2006.01)
G06F 7/06 (2006.01)
H04M 1/725 (2006.01)

(52) U.S. Cl.
CPC .... *G06F 17/30772* (2013.01); *H04M 1/72522* (2013.01); *H04M 1/72558* (2013.01)

(58) Field of Classification Search
None
See application file for complete search history.

(56) References Cited

U.S. PATENT DOCUMENTS

| 8,825,574 | B2 * | 9/2014 | Bodor et al. ............... 706/18 |
| 2005/0251807 | A1 | 11/2005 | Weel | |
| 2007/0149116 | A1 | 6/2007 | White | |
| 2008/0086379 | A1 * | 4/2008 | Dion et al. ............... 705/14 |
| 2008/0147711 | A1 * | 6/2008 | Spiegelman et al. ......... 707/102 |
| 2009/0055377 | A1 * | 2/2009 | Hedge et al. ................ 707/5 |
| 2010/0088327 | A1 * | 4/2010 | Holm et al. ............... 707/758 |
| 2010/0106730 | A1 | 4/2010 | Aminian | |
| 2011/0295843 | A1 | 12/2011 | Ingrassia, Jr. et al. | |
| 2012/0179693 | A1 | 7/2012 | Knight | |

FOREIGN PATENT DOCUMENTS

KR    10-2009-0079885    7/2009

OTHER PUBLICATIONS

International Preliminary Report on Patentability from PCT Application No. PCT/US2013/066213 issued Apr. 28, 2015.
International Search Report and Written Opinion from PCT Application No. PCT/US2013/066213 dated Feb. 14, 2014.

\* cited by examiner

*Primary Examiner* — Matt Kim
*Assistant Examiner* — Daniel Samwel
(74) *Attorney, Agent, or Firm* — Blank Rome LLP

(57) ABSTRACT

Systems and methods are provided for distributing a playlist of a user. The systems and methods receive an indication from the user of a song to add to the playlist and adds the song to the playlist. In aspects, the systems and methods analyze the playlist to determine whether an attribute of the playlist meets a specified parameter. In some cases, the specified parameter can be met if a musical attribute of the song is similar to a music profile of one of the users, or if an amount of songs on the playlist meets or exceeds a specified threshold. The systems and methods can enable the user to distribute the playlist either publicly or to a specified set of users if the specified parameter of the playlist is met.

18 Claims, 21 Drawing Sheets

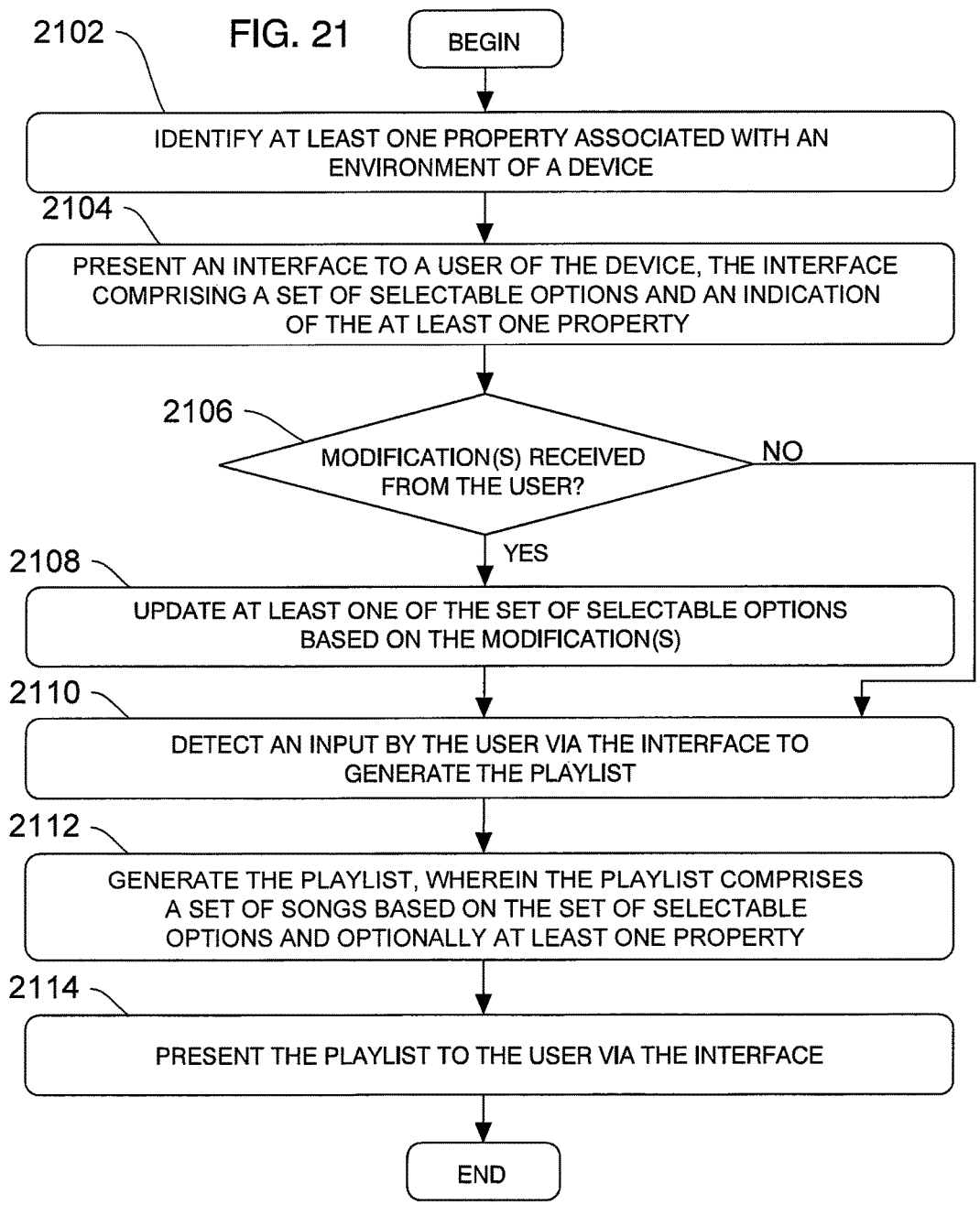

US 9,552,418 B2

SYSTEMS AND METHODS FOR DISTRIBUTING A PLAYLIST WITHIN A MUSIC SERVICE

FIELD

This application generally relates to systems and methods for implementing and managing a music service. In particular, the application relates to platforms and techniques for a socially-integrated music service and for distributing playlists based on various parameters.

BACKGROUND

Consumers have various options when it comes to listening to or otherwise consuming music and other media. In particular, some consumers play music from physical media such as compact discs, records, cassette tapes, and/or the like. Other consumers listen to music from digital audio files such as MP3s, AACs, WAV files, OGG-Vorbis files, FLAC files, and/or the like. In other cases, streaming services allow some users to stream digital music data stored on remote servers. With the advent and popularity of social networking, some platforms allow users of a social network to share playlists, songs, and artist profiles with other users of the social network.

In existing platforms and services, the discovery of music new or of potential interest to users can prove difficult. For example, even though two users may be connected via a social network, the users may not have the same taste in music. Therefore, the sharing of playlists and other music media by the users via the social network is inefficiently targeted. Further, when the users are physically in the same room, at a party or gathering, or are otherwise around each other, the existing services have no way to determine the musical tastes of each of the users who are or will be present. As a result, any music that is played will likely not appeal to everyone.

Accordingly, there is an opportunity for systems and methods for publishing or distributing playlists based on attributes of the playlists meeting certain parameters.

SUMMARY OF THE INVENTION

The application is defined by the appended claims. This description summarizes aspects of the embodiments and should not be used to limit the claims.

The application is intended to solve the above-noted business and technical problems by providing systems and methods for implementing and managing a music service. In one embodiment, a method of distributing a playlist of a user is provided. The method receives, from the user via an interface of a device, an identification of a song to add to the playlist and adds the song to the playlist. Further, in response to adding the song to the playlist, the method analyzes the playlist to determine whether an attribute of the playlist meets a specified parameter. The method further presents, to the user when the attribute of the playlist meets the specified parameter, an indication that the attribute of the playlist meets the specified parameter and an option to distribute the playlist.

In another embodiment, an electronic device capable of distributing a playlist of a user is provided. The electronic device comprises a display capable of presenting information to the user and a processor coupled to the display and configured to receive, from the user, an identification of a song to add to the playlist, and adding the song to the playlist. The processor is further configured to, in response to adding the song to the playlist, analyze the playlist to determine whether an attribute of the playlist meets a specified parameter and present, to the user when the attribute of the playlist meets the specified parameter, an indication that the attribute of the playlist meets the specified parameter and an option to distribute the playlist.

In a further embodiment, a non-transitory computer readable medium comprising computer instructions embodied thereon to cause a processor cause a processor to receive, from a user via an interface of a device, an identification of a song to add to a playlist and cause the processor to add the song to the playlist. The non-transitory computer readable medium further causes the processor to, in response to adding the song to the playlist, analyze the playlist to determine whether an attribute of the playlist meets a specified parameter and cause the processor to present, to the user when the attribute of the playlist meets the specified parameter, an indication that the attribute of the playlist meets the specified parameter and an option to distribute the playlist.

BRIEF DESCRIPTION OF THE DRAWINGS

For a better understanding of the invention, reference may be had to embodiments shown in the following drawings in which:

FIG. 21 is a flow diagram depicting music discovery techniques, in accordance with embodiments.

DETAILED DESCRIPTION OF PREFERRED EMBODIMENTS

Figure 1:
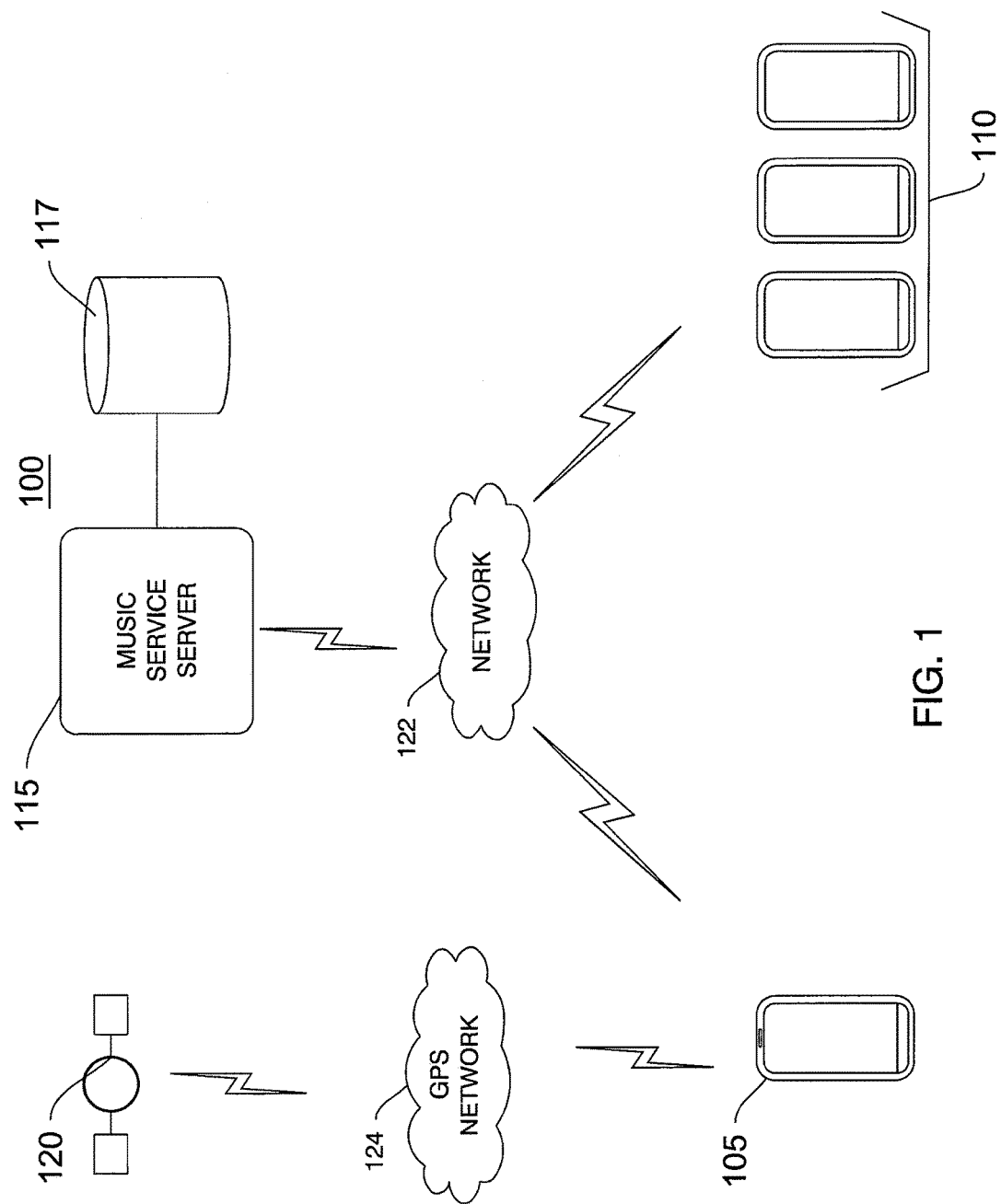
FIG. 1 is a block diagram illustrating an exemplary environment for implementing and managing a music service, in accordance with embodiments.

While the invention may be embodied in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

In accordance with one or more principles of the invention, systems and methods are provided for managing user subscriptions in a music service. According to embodiments, the music service presents an interface to a user of a device into which the user can input values associated with songs desired in a playlist. For example, the values can relate to locations, desired activities (e.g., jogging, "on the move," etc.), other users of the music service, moods of the user, and/or desired genres. The user can select to generate a playlist based on the inputted values, and the device can identify songs that match the inputted values, including music profiles of the users identified in the interface.

In some embodiments, the device can analyze private, semi-private, or public playlists of users to identify when the playlists meet or exceed a specified threshold or parameter. In response, the device can provide, to the associated users, an option to distribute the playlist to certain users or groups of users. In some cases, the option to distribute the playlist can be an option to make the playlist public or otherwise avail the playlist to various users within the music service. In embodiments, a playlist that is public can be available to and/or accessible by all users of the music service. In further embodiments, a playlist that is private can be accessible by the user who created the playlist. In still further embodiments, a playlist that is semi-private can be accessible by one or more additional users of the music service. According to other embodiments, the music service can provide interfaces to the users that allow the users to efficiently and effectively locate other users within the music service who share similar profiles (such as tastes or preferences) in music. The interfaces allow the users to connect to each other or otherwise share certain songs, playlists, or other data.

As used herein, a "music service" can be understood to be any service, platform, or the like with which a set of users can register. The set of users can use the music service to connect with each other, share information and data, and/or perform other functions. Further, as used herein, a "playlist" can be understood to be a listing of songs, tracks, and/or other media data files accessible to one or more users and from which the one or more users can select certain songs for playback. In some cases, the media data files can be accessible locally to the device from which the user is accessing the playlist. In other cases, the media data files can be accessible via streaming from a remote server. Still further, as used herein, a "music profile" of a user can be understood to encompass any data related the musical tastes, preferences, listening history, interactions or social network connections with artists and/or other users, listening trends, songs or artists that share similarities with other songs or artists that the user enjoys, has listened to, and/or is otherwise associated with the user, and/or any other data that can indicate the songs, bands, artists, genres, and/or musical eras that a user tends to enjoy or not enjoy. In embodiments, the music profile of the user can be based on other users, entities, or music or playlist curators that the user "follows," subscribes to, or is otherwise associated with in the music service.

FIG. 1 depicts an environment 100 comprising components and entities of the embodiments as discussed herein. It should be appreciated that the environment 100 is merely exemplary and can comprise fewer or more components and entities, as well as other various combinations of components and entities.

As shown in FIG. 1, the environment 100 comprises a device 105 configured to communicate with a music service server 115. In embodiments, it should be understood that the device 105 can be any type of device such as, for example, a smart phone, a notebook or desktop computer, a tablet device, a personal data assistant (PDA), or the like, comprising any type of hardware or software components, or combinations thereof. The music service server 115 can comprise a combination of hardware or software components, or combinations thereof, configured to support the facilitation of a music service. More particularly, a user of the device 105 can register for an account or a registration with the music service server 115 and the music service server 115 can provide music data to the user in accordance with a subscription of the user. For example, in some cases, the user can download songs, tracks, and/or other media data files from the music service server 115. In other cases, the music service server 115 can stream songs, tracks, and/or other media data files to the device 105 for consumption by the user of the device 105.

In embodiments as shown, the music service server 115 can couple to storage 117 that can be configured to store data associated with the music service server 115. For example, the storage 117 can store any associated music data as well as data related to subscriptions and other account information for users of the music service server 115. The device 105 can connect to the music service server 115 via a network 122 such as, for example, a wide area network (WAN) or other networks. The network 122 can facilitate any type of wireless data communication via any standard or technology (e.g., GSM, CDMA, TDMA, WCDMA, EDGE, OFDM, GPRS, EV-DO, WiMAX, WiFi, Bluetooth, UWB, and others). More particularly, the device 105 can send data to and receive data from the music service server 115 via the network 122. For example, the music service server 115 can receive subscription management requests from the device 105 and can transmit or stream music data to the device 105 according to the requests. As shown in FIG. 1, the environment 100 can further comprise a set of additional devices 110 that can also be configured to connect to the music service server 115 via the network 122. Each of the set of additional devices 110 can be associated with a set of additional users of the music service implemented by the music service server 115. More particularly, each of the set of additional users can have an associated account with the music service or can otherwise register with the music service.

The environment 100 can further comprise a satellite 120, such as a global positioning system (GPS) satellite that can be configured to provide GPS information to the device 105 via a GPS network 124. In particular, the device 105 can be configured with a GPS receiver chip that can calculate GPS coordinates to locate the device 105, determine a venue or specific location in which the device 105 is located, and perform other functionalities. Although FIG. 1 depicts the device 105 in communication with the satellite 120, it should be appreciated that each of the set of additional devices 110 can communicate with the satellite 120 via the GPS network 124. In some embodiments, the device 105 can calculate its approximate position or location using wireless local area network connections, cellular tower locations, and/or other connections or reference points.

Further, as shown in FIG. 1, the device 105 can be configured to connect to and/or exchange data with the set of additional devices 110 via a local area network (LAN) such as a WLAN connection 126. In embodiments, the WLAN connection 126 can be based on the IEEE 802.11 standard, or other standards or protocols. It should be appreciated that the mobile device 105 can communicate with the set of additional devices 110 via any type of local wired or wireless communication.

According to implementations, the music service server 115, the device 105, and the set of additional devices 110 can facilitate the management of music subscriptions Of the users of the respective devices 105, 110. More particularly, the music service server 115, the device 105, and/or the set of additional devices 110 can generate playlists for the users based on locations, music profiles, and/or other input data associated with the users and/or the respective devices 105, 110. Further, the music service server 115, the device 105, and/or the set of additional devices 110 can target appropriate users to which to distribute playlists or other music data based on the input data. Still further, the music service server 115, the device 105, and/or the set of additional devices 110 can optimize or otherwise improve the relevance of music or playlist data associated with the subscriptions that the users have within the music service. Moreover, the music service server 115, the device 105, and/or the set of additional devices 110 can provide an interface for effectively receiving inputs for generating a playlist. Collectively, these described functions and benefits can be implemented within a music service facilitated by and accessible to the components of the environment 100.

In embodiments, each of the users of the music service, such as the users of the devices 105, 110 can have an associated music profile. The music profile for a user can be identified, generated, and/or otherwise analyzed according to attributes associated with songs or artists that the user has listened to, that are included in the user's playlists, that have been shared with the user, songs or artists that are similar to other songs or artists that the user enjoys, has listened to, and/or is otherwise associated with the user. For example, the attributes can encompass structures, compositions, rhythms, meters, roots, tonalities, instrumentations, leanings or stylings, recording techniques, influences, types of instrumental ensembles, types of individual instruments, lyrical content, vocal presences, and/or other elements. In some embodiments, the music profile can also be based on listening behaviors (e.g., songs skipped, listening times, etc.), ratings or votes of artists and/or playlist curators, any social network connections (e.g., followings, connections, etc.) of any users, artists, playlists curators, and/or the like. The music profiles of the users can be used in the implementation and execution of the described embodiments.

FIGS. 2-16 depict exemplary screenshots associated with the execution and implementation of the music service. More particularly, the exemplary screenshots can be implemented within the music service and can be displayed on a device of the user, such as the device 105. The data associated with the exemplary screenshots can be transmitted to, received from, and/or synchronized with a server, such as the music service server 115. The user can interface with the functions of the music service via a user interface of the device, such as a touchscreen. It should be appreciated that the screenshots of FIGS. 2-16 are merely exemplary and can comprise other various details and/or elements.

Figure 2:
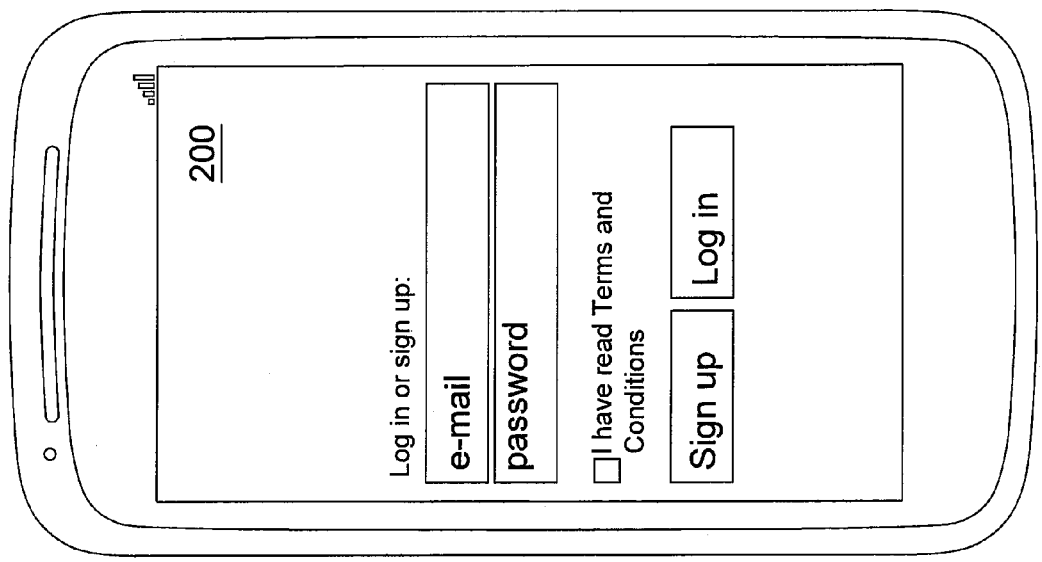
FIGS. 2-16 illustrate exemplary screenshots of a music service, in accordance with embodiments.

Referring to FIG. 2, depicted is an exemplary screenshot of a login screen 200 for the music service. As shown in FIG. 2, the login screen 200 can comprise fields in which a user can enter login credentials (e.g., email, user name, password, etc.) as well as selectable options that allow the user to sign up for the music service or log into the music service.

Figure 3:
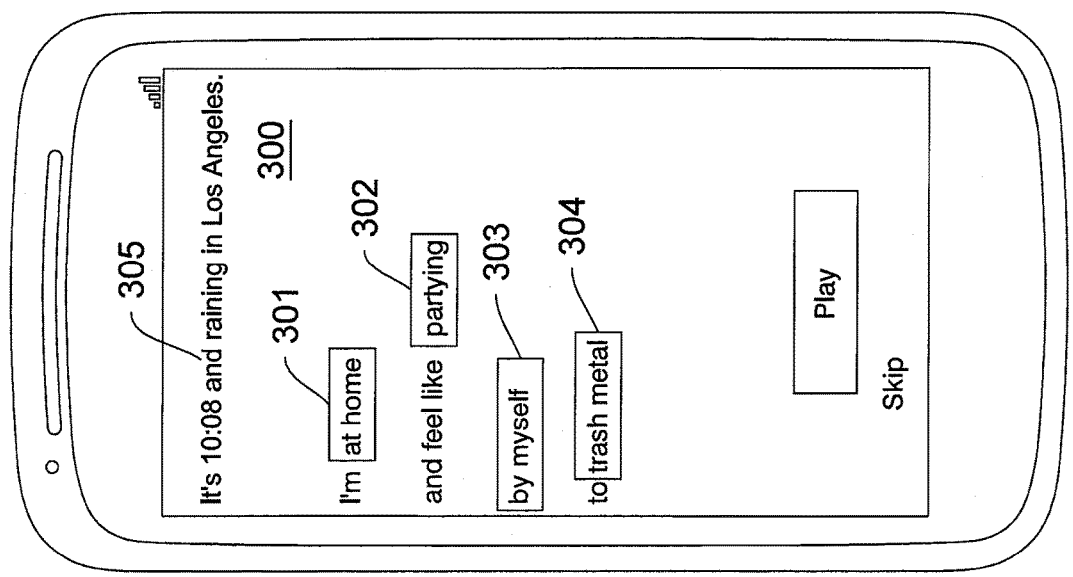

Referring to FIG. 3, depicted is an exemplary screenshot of an input screen 300 into which a user of the music service can input variables associated with desired playlist attributes. More particularly, the user can input variables that the music service can use to assess one or more songs desired by the user and to generate a playlist that comprises the one or more songs and/or other related songs. In embodiments as shown, the input screen 300 can display a sentence comprising a set of selectable options. More particularly, the set of selectable options can correspond to components of a sentence (e.g., subject, verb, etc.) can comprise a setting input 301, an action input 302, an association input 303, and a music genre input 304. In one embodiment, the setting input 301 can correspond to a location, the action input 302 can correspond to a desired activity, the association input 303 can correspond to indications of one or more additional users, and the music genre input 304 can correspond to a desired music genre. It should be appreciated that the elements of the sentence, as well as the inputs 301, 302, 303, 304 are merely exemplary and can comprise other various elements and/or inputs. Additionally, there can be additional inputs that are presented as components of the sentence such as, for example, an input for the mood of the user. Further, it should be appreciated that the layout of the elements of the sentence is merely exemplary and can be presented in any way that allows selection of values and variables associated with the inputs 301, 302, 303, 304. In some preferred embodiments, the sentence can generate whimsical, fanciful, funky, and/or unexpected combinations that can yield interesting playlists.

In embodiments, the values for each of the inputs 301, 302, 303, 304, as well as the elements of the sentence, can be preset or can be generated randomly upon the user initializing or logging into the music service. In some cases, the user can "shake" the device to change the elements or values or can manually change the elements or values on an individual basis. For example, the user can select a drop-down menu that displays available values or options that the user can select for the respective inputs 301, 302, 303, 304. In some cases, the device can identify a current time, location (e.g., specific venue, city, etc.), weather condition, and/or other metrics associated with an environment of the device. The device can display indications of the environment on the input screen 300. For example, as shown in FIG. 3, the input screen 300 can indicate a summary 305 of the environment conditions.

Figure 4:
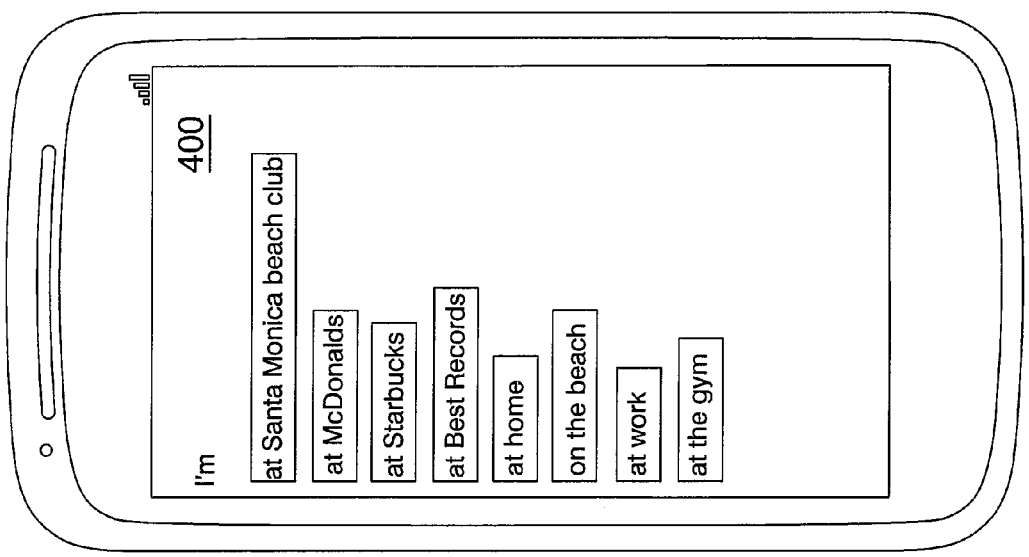

Referring to FIG. 4, depicted is a listing of available values 400 for the setting input 301 as discussed with respect to FIG. 3. In some cases, the available values 400 can be specific locations, such as a specific gym, a specific office building, a specific restaurant, or the like. In other cases, the available values can be generic locations such as, as shown in FIG. 4, "at work," "at the gym," "at a friend's place," or others. In still further cases, the available values can be generic activities such as "on the move," "jogging," "relaxing," etc. In embodiments, the available values for the setting input 301 can be identified by comparing a location of the device (such as via a GPS chip) to locations of nearby sites, monuments, restaurants, homes, businesses, and/or the like. Although not shown in FIG. 4, the available values for the setting input 301 can be ordered based on distance from the device, relevance, and/or other metrics, and can comprise indications of the distance from the device.

Figure 5:
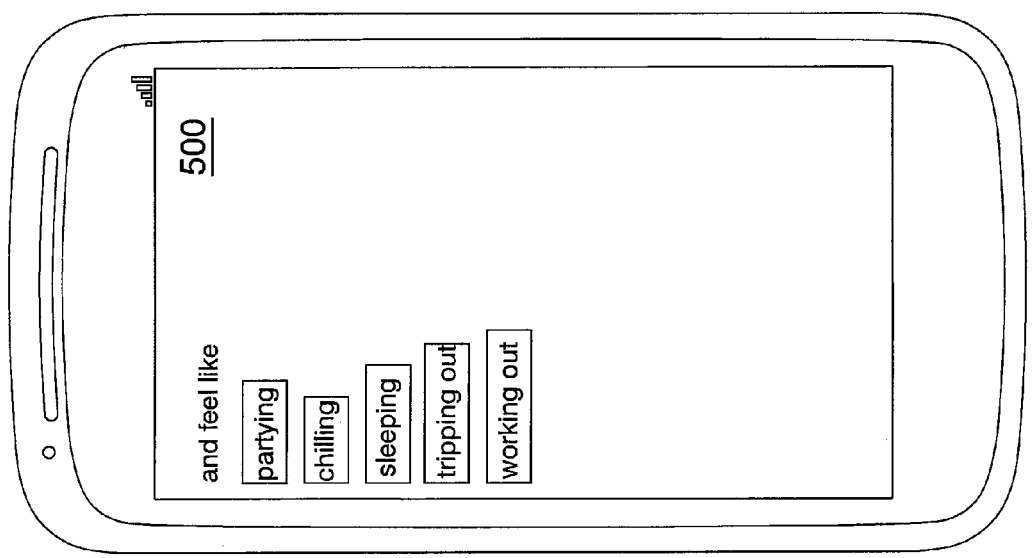
Figure 6:
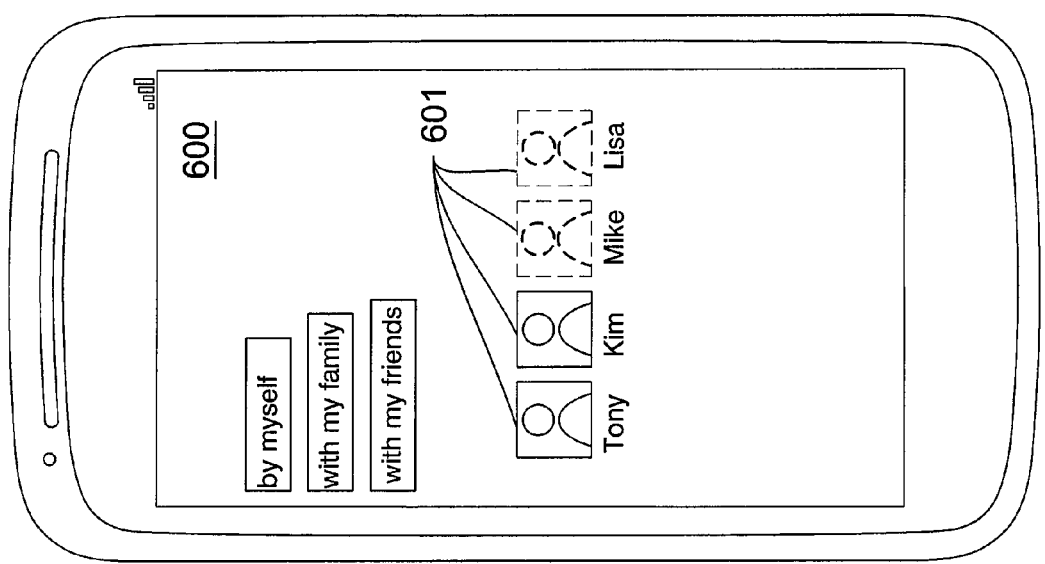

Referring to FIG. 5, depicted is a listing of available values 500 for the action input 302 as discussed with respect to FIG. 3. More particularly, the available values 500 can correspond to actions that the user of the device may feel like doing at the time, or may otherwise want songs of a generated playlist to encompass. FIG. 6 depicts a listing of available values 600 for the association input 303 as discussed with respect to FIG. 3. More particularly, the available values 600 can correspond to specific users, individuals, a general group of individuals, and/or other indications of people or users who in some cases can be present along with the user or in a vicinity or proximity of the user.

In preferred embodiments, one of the available values 600 can be contacts 601 of the user within the music service. More particularly, the user can select the contacts 601 value that allows the user to select specific contacts within the associated music service. In some cases, one or more of the contacts 601 can be present along with the user or otherwise located within a vicinity or proximity to the user. Further, in some cases, one or more of the contacts 601 can be public figures, celebrities, and/or the like. It should be appreciated that one or more of the contacts 601 do not have to be present when the user performs the selection. For example, in preparing to host a party, the user can select one or more contacts who the user anticipates will be later attending the party. In other cases, the one or more of the contacts 601 do not have to be present with the user or anticipated to be present with the user. In embodiments, in identifying the contacts 601, the device can scan an address book or contact list of the user, can scan for connections of the user in one or more social networking services, and/or can scan based on other connections of the user or inputs from the user. The identified contacts may or may not be members of or registered with the music service and/or connected to the user via the music service.

Figure 7:
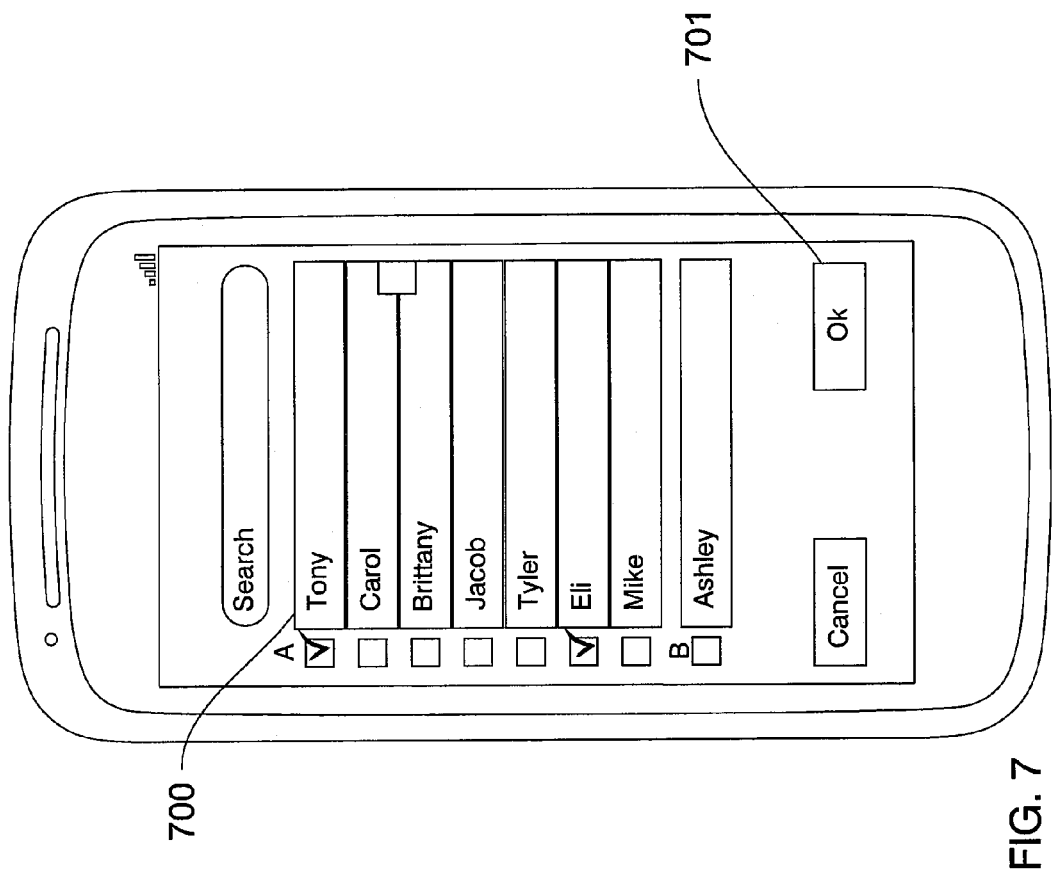

In operation, in response to selecting the contacts 601 value, the device can display a listing 700 similar to that depicted in FIG. 7. More particularly, the listing 700 can comprise a list of contacts of the user. In some cases, one or more of the contacts can be "connected" to the user via the music service. In other cases, one or more of the contacts do not have to be connected to the user via the music service, however selecting those contact(s) can send a request to the selected contact(s) to connect to the user. In embodiments, each of the contacts in the listing 700 can have an associated music profile that can be used to generate the playlist. The user of the device can select one or more of the contacts in the listing 700 and can then select an "OK" button 701 to confirm the selection.

Figure 8:
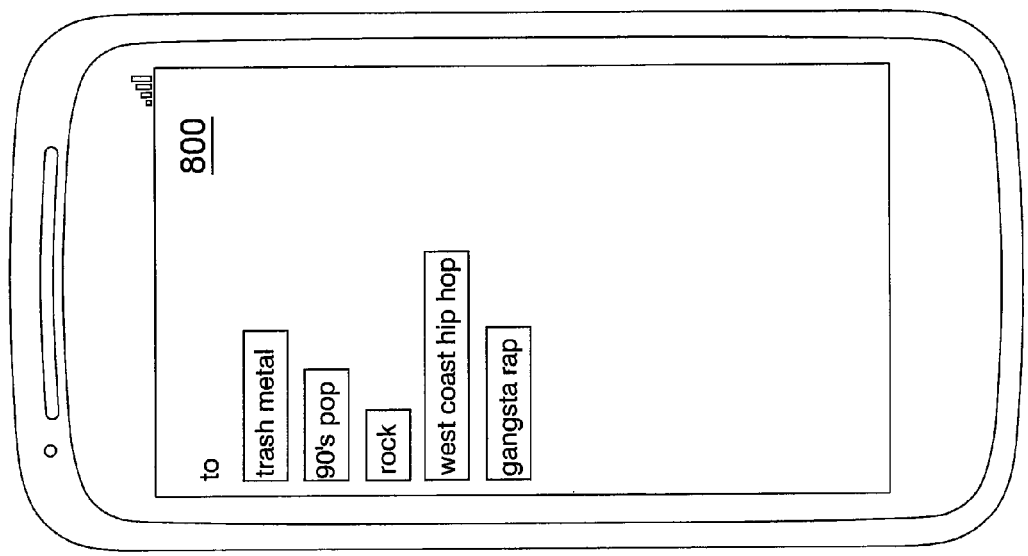
Figure 9:
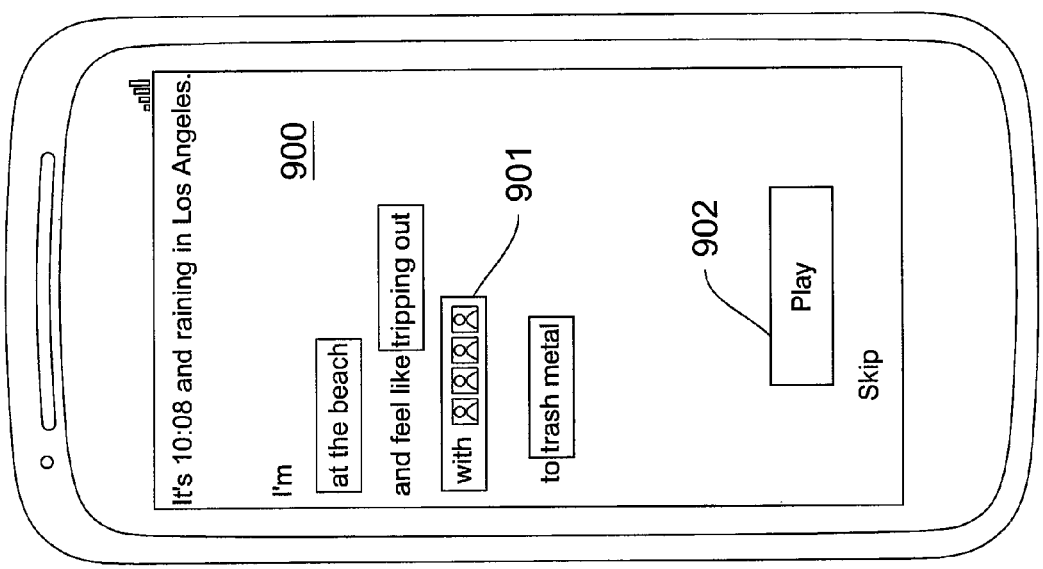

Referring to FIG. 8, depicted is a listing of available values 800 for the music genre input 304 as discussed with respect to FIG. 3. More particularly, the available values 800 can correspond to genres of music that the user may desire for the songs of the playlist. For example, as shown in FIG. 8, the available values 800 can comprise trash metal, 90's pop, rock, west coast hip hop, gangsta rap, and/or others. FIG. 9 depicts an exemplary "sentence" comprising values selected by the user for each of the inputs 301, 302, 303, 304. As shown in FIG. 9, an exemplary association field 901 lists contacts selected by the user and whose music profiles can be used to generate the playlist. In embodiments, the association field 901 can comprise profile pictures, names, and/or other indications of the selected contacts. The user can, when for example satisfied with the selected values of the sentence, select a "play" button 902.

In embodiments, in response to the user selecting the "play" button 902, the device can retrieve or access the music profiles associated with the selected contacts in the association field 901, and can generate a playlist based on the data of the music profiles as well as the values of the other inputs 301, 302, 304. More particularly, the device can request the music profiles from a remote server such as the music service server 115, analyze the music profiles, and identify songs or tracks that match or otherwise relate to the music profiles and/or the values of the other inputs 301, 302, 304. For example, the identified songs or tracks can be songs or tracks that individuals have identified as having certain attributes that match or are based on one or more of the inputs 301, 302, 303, 304. The device can download the identified songs from the music service server 115 or the music service server 115 can stream the identified songs to the device for consumption by the user. In embodiments, the number of songs on the playlist can be set by the user or other entities or can be a default value.

Figure 10:
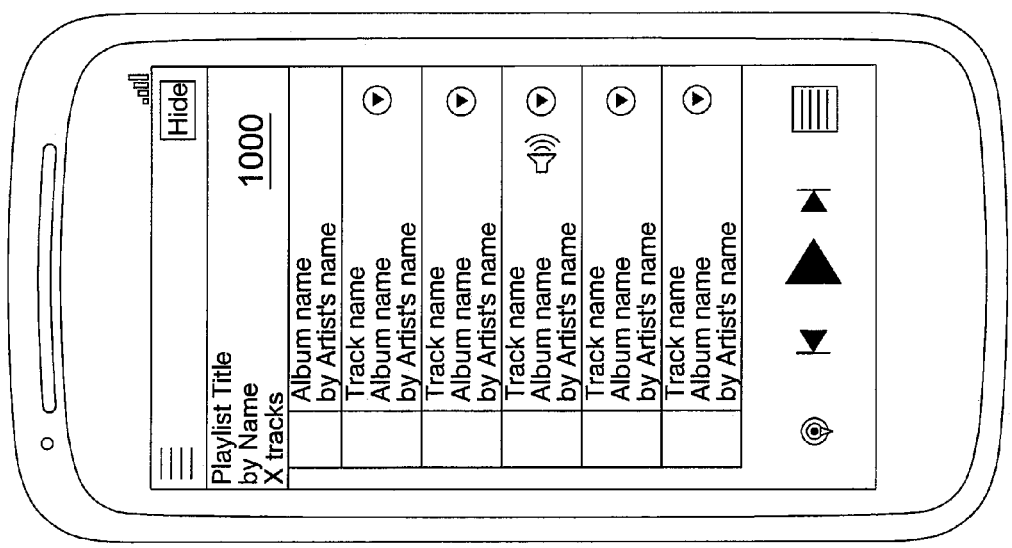

FIG. 10 depicts an exemplary playlist 1000 generated according to the embodiments as described herein. More particularly, the playlist 1000 can comprise songs that are based on the selected values for each of the inputs 301, 302, 303, 304. In embodiments, the user can play one or more songs in the playlist 1000, the entire playlist 1000, and can skip among songs of the playlist 1000. In some cases, the user of the device can select one or more of the songs to make available offline, in which case the device can download those songs for storage on the device. In other cases, the songs can be streamed from the music service server 115 via the network 122. In embodiments, the playlist 1000 can comprise an indication of which particular songs correspond to the music profiles of specific contacts selected for the association input 303.

Figure 11:
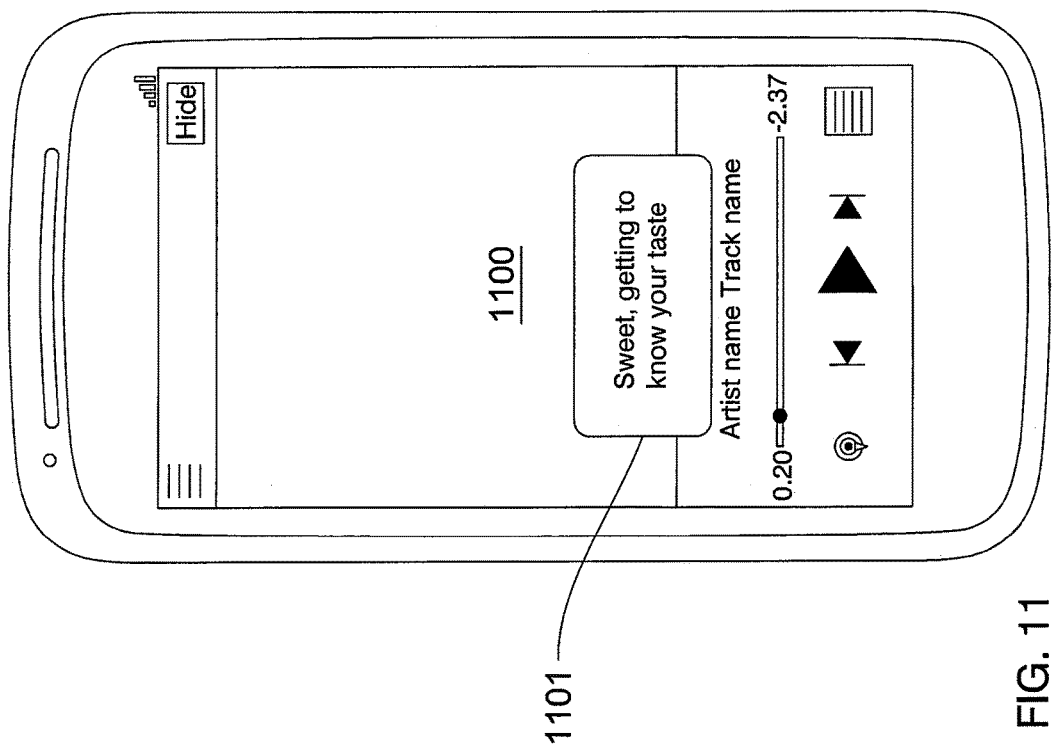

FIG. 11 depicts an exemplary playback screen 1100 associated with a playlist being listened to by a user. In some embodiments, the device can "learn," identify, and/or update music profiles of the user during playback by the user. More particularly, the device can update a user's music profile data according to the songs listened to in the playlist. In some cases, the updating can be in response to the user rating a song, providing an indication or an approval or disapproval of a song (e.g., thumbs up or thumbs down), skipping a song, listening to a certain portion of the song, and/or performing other actions. As shown in FIG. 11, the playback screen 1100 can display an indication 1101 of the device and/or service "learning" or otherwise performing the updating. In some cases, the indication 1101 can be displayed after a specified threshold has been met or exceeded such as, for example, when a user has rated three (3) different songs by the same artist.

The systems and methods as described herein can be configured to analyze a playlist that a user is compiling or has already compiled to determine if the playlist meets a specified parameter or threshold. Further, the systems and methods can provide the user with an option to distribute the playlist in response to the playlist meeting the specified parameter. In some cases, the parameter can be met when the musical properties of the songs in a user's playlist match the music profiles of other users in the music service, such as users directly connected to the user. In other cases, the parameter can be met when the properties of certain songs in the playlist meet or exceed specified amounts. For example, the parameter can be met when the playlist comprises ten (10) tracks by the same artist from different albums. For further example, the parameter can be met when the playlist comprises fifteen (15) tracks from various artists but having the same genre.

It should be appreciated that other parameter or threshold properties are envisioned, including those related to matching the musical tastes, preferences, and/or profiles of other users or groups of users within the music service, as well as those related to meeting or exceeding certain amounts of songs associated with artists, albums, genres, styles, and/or other properties. Further, it should be appreciated that the parameter or threshold properties can be met when the playlist of the user is private to the user, public to all users of the music service, shared with other users or groups of users of the music service, and/or in other states of distribution.

Figure 12:
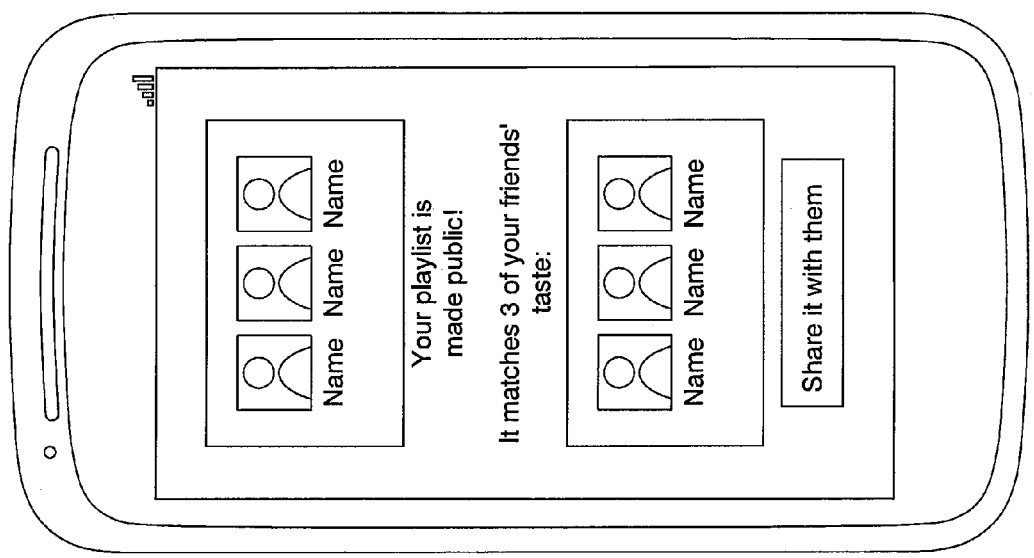

Referring to FIG. 12, depicted is an exemplary screenshot of the parameter functionality in one regard. More particularly, in the exemplary scenario, a user has made public a playlist comprising a set of songs. It should be generally understood that making a playlist public entails availing the playlist to certain users or groups of users, such as users or groups of users within the music service. Further, making a playlist public can also entail availing the playlist to all users of the music service. In response to the user making the playlist public, the device can analyze properties of the set of songs to determine whether the playlist matches the music profiles of other users in the music service. In the exemplary scenario as shown in FIG. 12, the device determines that the playlist matches the music profiles of three (3) of the user's connections in the music service. Further, the device can provide an indication of the three connections, as well as a selectable option to share the playlist with those three connections. More particularly, when the user selects to share the playlist, the music service can provide a notification of the playlist to the three connections. Upon receipt of the notification, the three connections can access or otherwise listen to the set of songs in the playlist.

Figure 13:
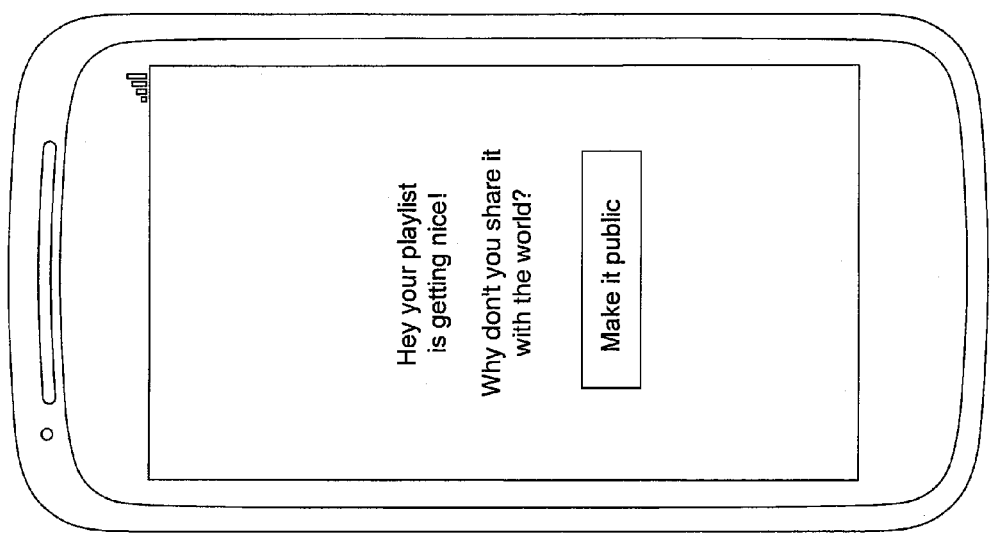

Referring to FIG. 13, depicted is an exemplary screenshot of the parameter functionality in another regard. More particularly, in the exemplary scenario, the playlist created by a user has met a specified parameter, and the device can provide the user with an option to distribute the playlist. As discussed herein, the specified parameter can be a default value or can be set by the user, and can relate to the properties of the songs in the playlist meeting or exceeding specified amounts. For example, the specified parameter can be met when playlist a specified amount of songs from various artists of the same genre. Further, the device can provide an indication that the playlist meets the parameter (e.g., "Hey your playlist is getting nice!"), and a selectable option to distribute the playlist. In the scenario as depicted in FIG. 13, the device can provide a selectable option to make the playlist public (e.g., allow all users, or certain users or groups of users of the music service to access and/or view the playlist). It should be appreciated that other distribution options are envisioned, such as an option to distribute the playlist to specific users, distribute the playlist to specific users whose music profiles match the attributes of the playlist, and/or other distribution options.

According to embodiments, the music service can provide an interface to users of the music service to allow the users to navigate and interact with the functionalities of the music service, as well as gauge musical compatibilities among or between other users. The interface can allow the users to easily and efficiently discover new users, artists, genres, and the like, to enhance the music playback and discovery processes. It should be appreciated that the interactions by the users with the music service is a factor in the building or "learning" of that user's music profile.

Figure 14:
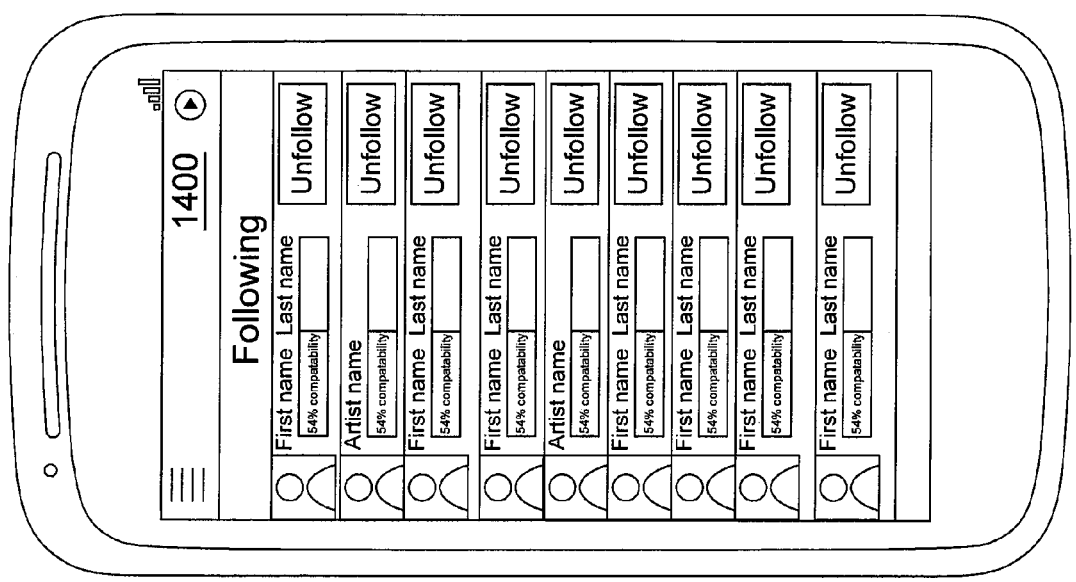

Referring to FIG. 14, depicted is an exemplary screenshot of an interface 1400 of the music service, according to embodiments. The interface 1400 can be tailored to the subscriptions of the associated user accessing or otherwise viewing the interface 1400. As shown in FIG. 14, the interface 1400 can comprise a listing of users, artists, record labels, and/or other entities that the user is "following." More particularly, the user can be said to be following another user if the user subscribes to another user's playlists, publishings, updates, and/or the like, and/or is otherwise connected to the another user via the music service. In some cases, the interface 1400 can list users, artists, record labels, and/or other entities that the user is not following or otherwise connected. In such cases, the interface 1400 can provide an option for the user to follow or connect to the selected entity.

As shown in FIG. 14, the listing of entities can comprise data associated with the connected users, such as an indication of the connected users and profile pictures of the connected users. Further, the listing of users can comprise an indication of the compatibility between the user and each of the connected users. In embodiments, the device can examine the music profiles of the appropriate users to calculate the compatibility according to any known algorithms, techniques, or calculations. In embodiments as shown, the higher the compatibility percentage for a particular user, the greater the compatibility between the users. In some embodiments, the interface 1400 can also comprise an option to "unfollow" or otherwise disconnect from a particular user. Further, in some embodiments, the listing of entities can be ordered according to on compatibility, duration of connection, and/or other metrics.

Figure 15:
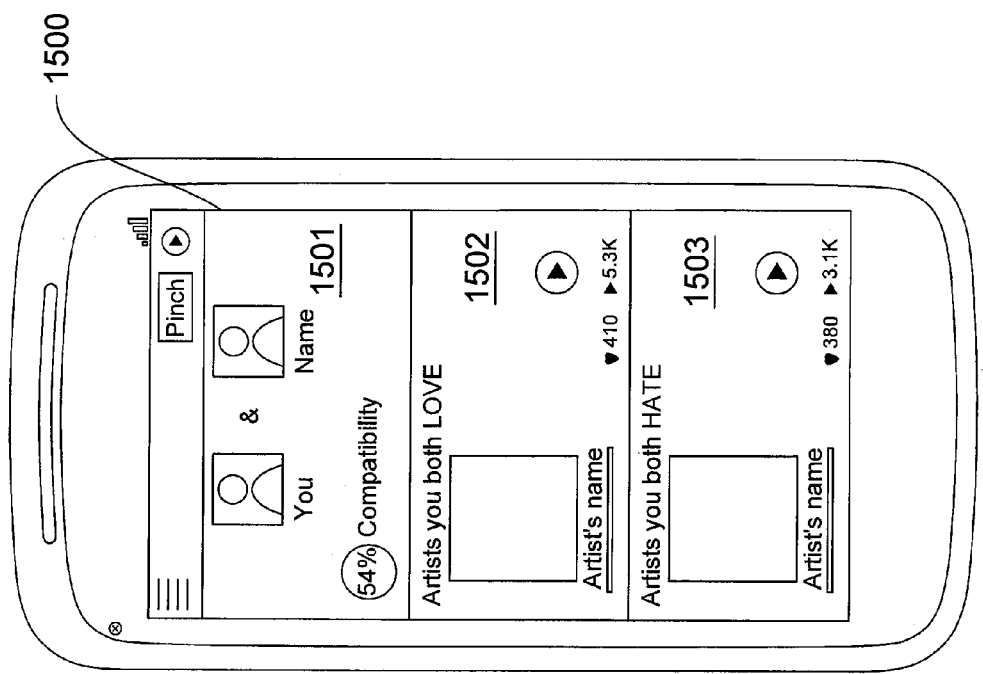

Referring to FIG. 15, depicted is an exemplary screenshot of an interface 1500 of the music service, according to embodiments. The interface 1500 can generally depict compatibility data between two users of the music service. In embodiments as shown, the interface 1500 can comprise a section 1501 comprising an indication of the two users as well as a percentage compatibility. Further, the interface 1500 can comprise a section 1502 that lists artists that the two users both love (or like, enjoy, etc.). Still further, the interface 1500 can comprise a section 1503 that lists artists that the two users both hate (or dislike, do not enjoy, etc.). The sections 1502, 1503 can also comprise metrics associated with the particular artist such as, for example, how many "followers" the artist has or how many "plays" the artist has recorded. In embodiments, the interface 1500 can also detail artists for which the users have differing opinions, playlists that both of the users like or subscribe to, and/or other types of information, data, and/or metrics.

Figure 16:
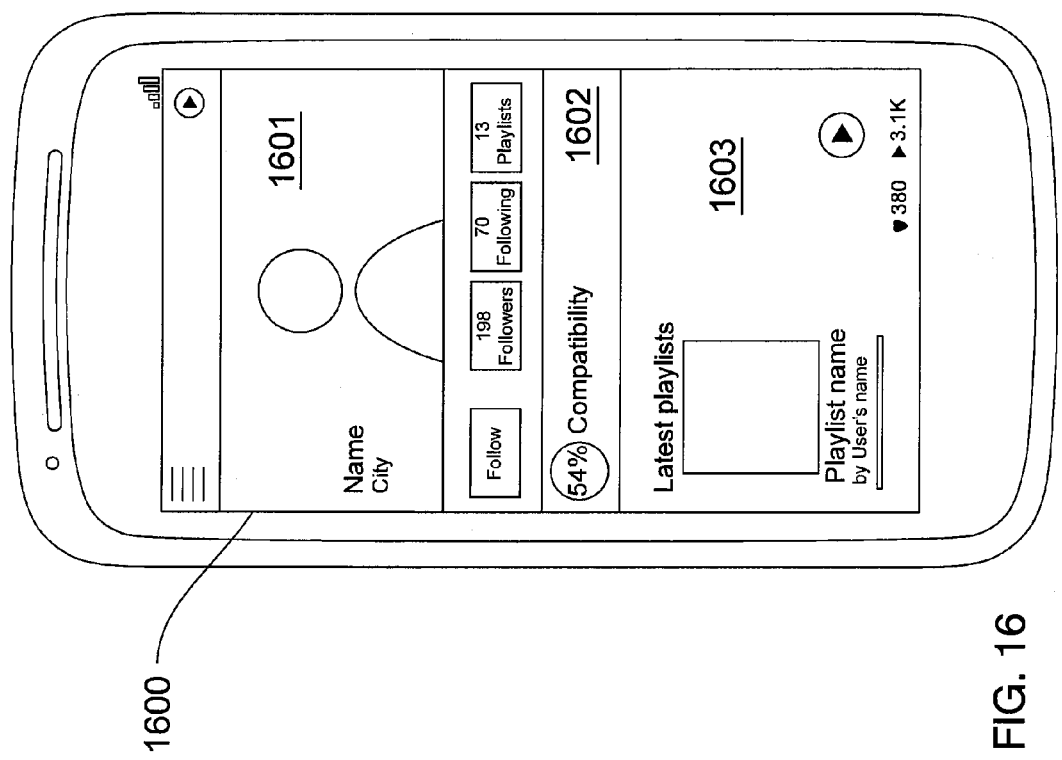

Referring to FIG. 16, depicted is an exemplary screenshot of an interface 1600 of the music service, according to embodiments. The interface 1600 can generally depict information associated with a profile of a user of the music service. In embodiments as shown, the interface 1600 can comprise a section 1601 comprising general information about the user such as, for example, a name, image, location, a selectable option to follow the user, and/or other information or metrics. Further, the interface 1600 can comprise a section 1602 indicating a compatibility percentage of the user with another user, such as a user accessing the profile of the user. Still further, the interface 1600 can comprise a playlist section 1603 that lists the playlists that are created by or generated for the user. In some cases, another user accessing the profile of the user can select to subscribe to or play one or more of the playlists listed in the playlist section 1603.

Figure 17:
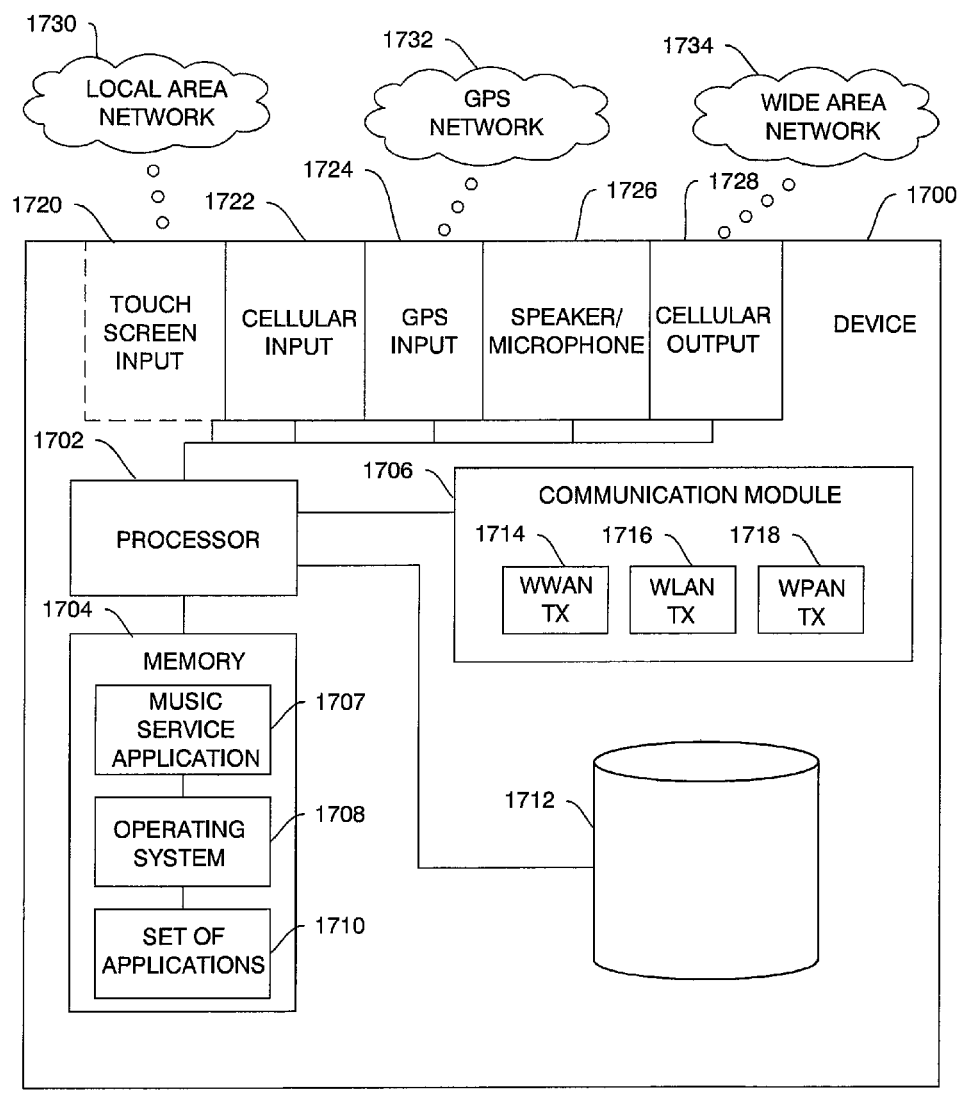
FIG. 17 is a diagram of an exemplary device configured to interface with a music service, in accordance with embodiments.

Referring to FIG. 17, depicted is an exemplary device 1700 and components thereof. More particularly, a user can use the device 1700 to access the music service. It should be appreciated that FIG. 17 represents a generalized schematic illustration and that other components can be added or existing components can be removed or modified.

As shown in FIG. 17, the device 1700 can comprise a set of ports that can receive input signals or data from, or output signals or data to, other components of a media distribution environment, such as the environment 100 as discussed with respect to FIG. 1. More particularly, a cellular input port 1722 can receive cellular data from a wide area network 1734 (such as various private or public networks), a GPS input port 1724 can receive GPS coordinate data from a GPS network 1734, and a cellular output port 1728 can output data to the wide area network 1734. The device 1700 can further comprise an optional touchscreen input port 1720 that can receive inputs from interactions with a touchscreen by a user operating the device 1700. Additionally, the device 1700 can comprise a speaker and a microphone (1726) that can be configured to output audio and receive audio to convert to an electronic signal, respectively.

The device 1700 can further comprise a processor 1702 communicating with a memory 1704, such as electronic random access memory (RAM), or other forms of transitory or non-transitory computer readable storage mediums, operating under control of or in conjunction with an operating system 1708. The operating system 1708 can be any commercial, open-source, or proprietary operating system or platform. The processor 1702 can communicate with a database 1712, such as a database stored on a local hard drive. While illustrated as a local database in the device 1700, the database 1712 can be separate from the device 1700.

The processor 1702 can further communicate with a communication module 1706, such as a wired or wireless data connection, which in turn communicates with the wide area network 1734. Further, the communication module 1706 can comprise radio transceivers that communicate with a wireless local area network 1730 or other networks, such as various personal area networks. The communication module 1706 can comprise a WWAN transceiver 1714 capable of communicating with the wide area network 1734, a WLAN transceiver 1716 capable of communicating with the local area network 1730, and a WPAN transceiver 1718 capable of communicating with a personal area network (such as a Bluetooth® network).

The set of ports 1720, 1722, 1724, 1726 of the device 1700 can use the components of the communication module 1706 to connect to the entities of the environment 100. For example, the cellular input port 1722 can receive streaming song data via the WWAN transceiver 1714. The processor 1702 can also communicate with a set of applications 1710 that can be configured to execute control logic and perform data processing to perform the functions and techniques as discussed herein. For example, the set of applications 1710 can comprise a music service application 1707 that can provide the interfaces as described herein, receive inputs from the user, and facilitate the communication of data among the entities of the environment 100. It should be appreciated that other applications 1710 and functionalities thereof are envisioned.

While FIG. 17 illustrates the device 1700 as a standalone system using a combination of hardware and software, the components of the device 1700 can also be implemented as a software application or program capable of being executed by a conventional computer platform. Likewise, the components of the device 1700 can also be implemented as a software module or program module capable of being incorporated in other software applications and programs. In either case, the components of the device 1700 can be implemented in any type of conventional proprietary or open-source computer language.

Figure 18:
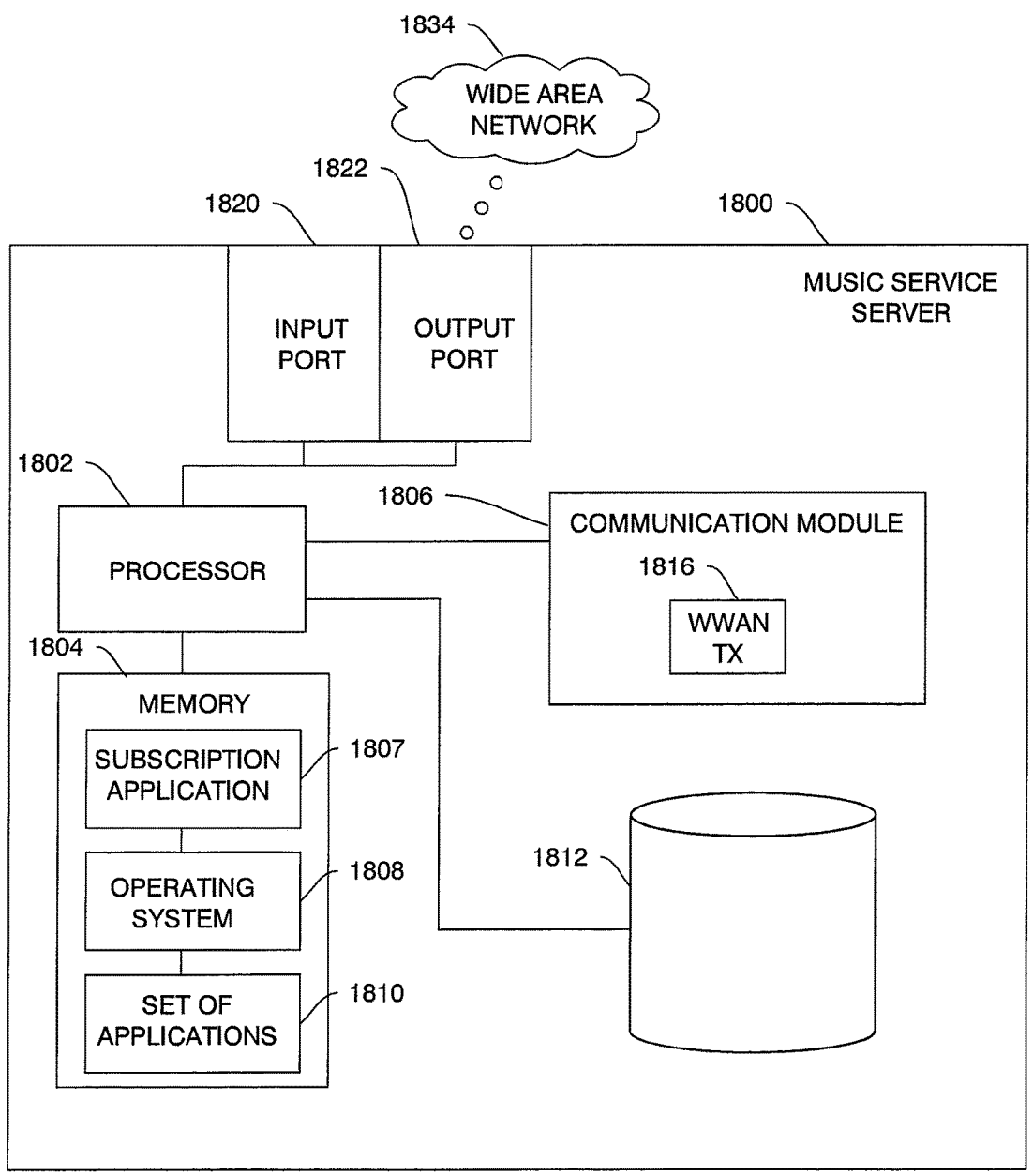
FIG. 18 is a diagram of an exemplary music service server, in accordance with embodiments.

Referring to FIG. 18, depicted is an exemplary server and components thereof. More particularly, the server 1800 can be the music service server 115 as discussed with respect to FIG. 1. It should be appreciated that FIG. 18 represents a generalized schematic illustration and that other components can be added or existing components can be removed or modified.

As shown in FIG. 18, the server 1800 can comprise a set of ports that can receive input signals or data from, or output signals or data to, other components of a media distribution environment, such as the environment 100 as discussed with respect to FIG. 1. More particularly, an input port 1820 can receive cellular or other types of data from a wide area network 1834 (such as various private or public networks), and an output port 1822 can output data to the wide area network 1734, such as streaming music data.

The server 1800 can further comprise a processor(s) 1802 communicating with a memory 1804, such as electronic random access memory (RAM), or other forms of transitory or non-transitory computer readable storage mediums, operating under control of or in conjunction with an operating system 1808. The operating system 1808 can be any commercial, open-source, or proprietary operating system or platform. The processor 1802 can communicate with a database 1812, such as a database stored on a local hard drive. While illustrated as a local database in the server 1800, the database 1812 can be separate from the server 1800.

The processor 1802 can further communicate with a communication module 1806, such as a wired or wireless data connection, which in turn communicates with the wide area network 1834. In particular, the communication module 1806 can comprise a WWAN transceiver 1816 capable of communicating with the wide area network 1834. The set of ports 1820, 1822 of the server 1800 can use the components of the communication module 1806 to connect to the entities of the environment 100. For example, the input port 1820 can receive playlist preference data via the WWAN transceiver 1816, and the output port 1822 can stream audio data via the WWAN transceiver 1816. The processor 1802 can also communicate with a set of applications 1810 that can be configured to execute control logic and perform data processing to perform the functions and techniques as discussed herein. For example, the set of applications 1810 can comprise a subscription application 1807 that can support the functionalities of the music service, as described herein. It should be appreciated that other applications 1810 and functionalities thereof are envisioned.

While FIG. 18 illustrates the server 1800 as a standalone system using a combination of hardware and software, the components of the server 1800 can also be implemented as a software application or program capable of being executed by a conventional computer platform. Likewise, the components of the server 1800 can also be implemented as a software module or program module capable of being incorporated in other software applications and programs. In either case, the components of the server 1800 can be implemented in any type of conventional proprietary or open-source computer language.

Figure 19:
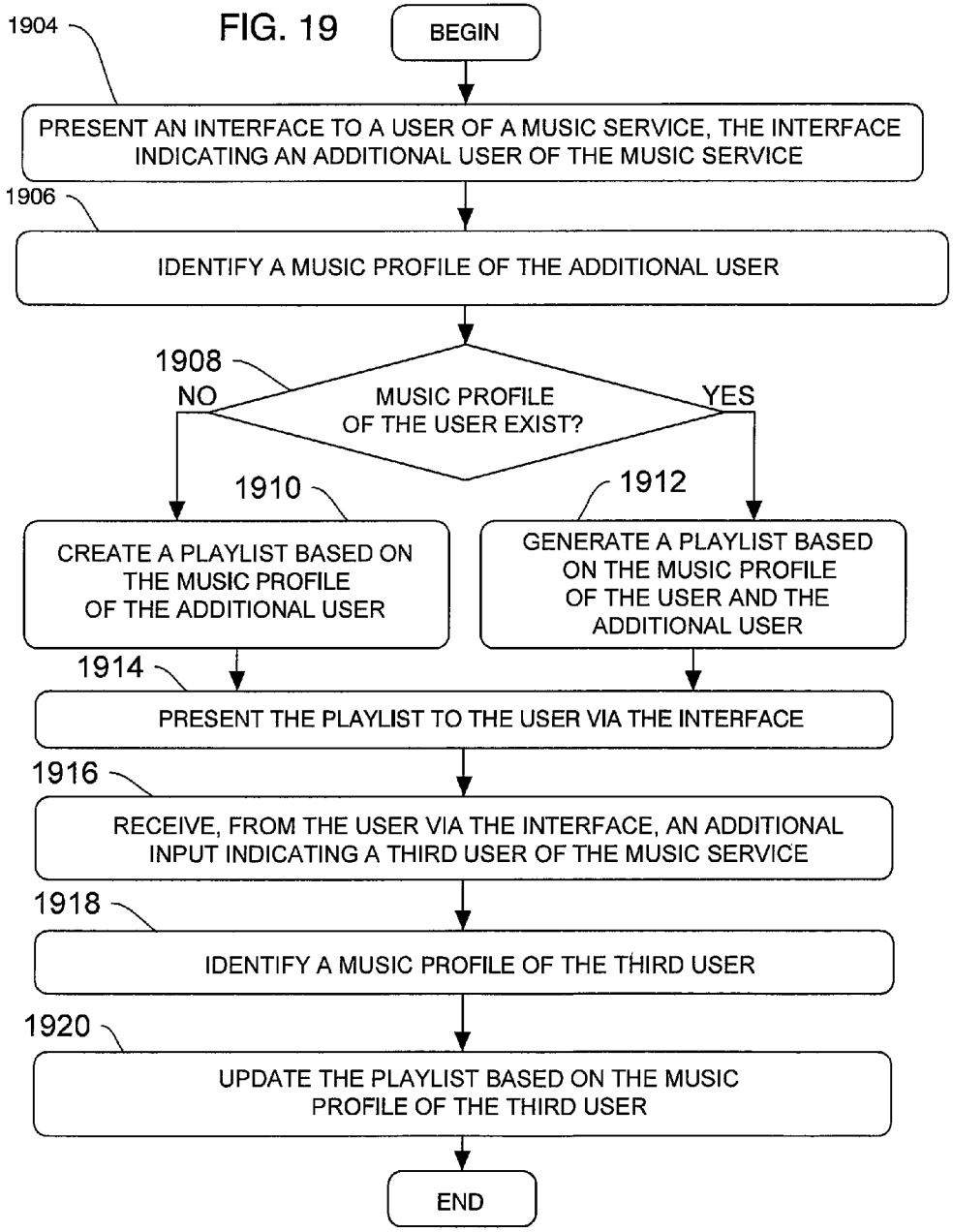
FIG. 19 is a flow diagram depicting playlist generation techniques, in accordance with embodiments.

FIG. 19 is a flowchart of a method 1900 for a device (such as the device 105) to generate a playlist. It should be appreciated that the functionalities of the method 1900 can be implemented with the device interfacing with a remote server, such as the music service server 115. The method 1900 begins with the device presenting 1904 an interface to a user of a music service, wherein the interface indicates an additional user of the music service. In some cases, the additional user can be present with the user and/or can be connected to the user within the music service. In some embodiments, the device can compare a location of the user or the device to location(s) of additional user(s) in the proximity of the location of the user or the device, and automatically provide indications of the additional users(s). Stated differently, the device can automatically detect which additional users of the music service are within a proximity of the user or the device (such as via near field communication (NFC) technology), such that the user does not have to explicitly select the additional users.

The device identifies 1906 a music profile of the second user. More particularly, the music profile is identified from listening habits, created playlists, and/or other preferences and data associated with the music profile of the additional user, as discussed herein. The device determines 1908 if a music profile of the user exists. If the music profile of the user does not exist (NO, 1910), the device generates a playlist based on the music profile of the additional user. If the music profile of the user does exist (YES, 1912), the device generates a playlist based on the music profiles of the first user and the second user. In embodiments, the playlist can comprise a default amount of songs or any amount selected by the user or other entity. The device presents 1914 the playlist to the user via the interface. The user can access the playlist to play one or more of the songs, share the playlist, modify the playlist, and/or perform other functions.

The device optionally receives 1916, from the user via the interface, an additional input indicating a third user of the music service. For example, the third user can be a user who has joined the user at an event or gathering. In some cases, the device automatically detects a presence of the third user. The device optionally identifies 1918 a music profile of the third user and updates 1920 the playlist based on the music profile of the third user. Specifically, the updated playlist can be based on the music profiles of the first user, the second user, and the third user.

Figure 20:
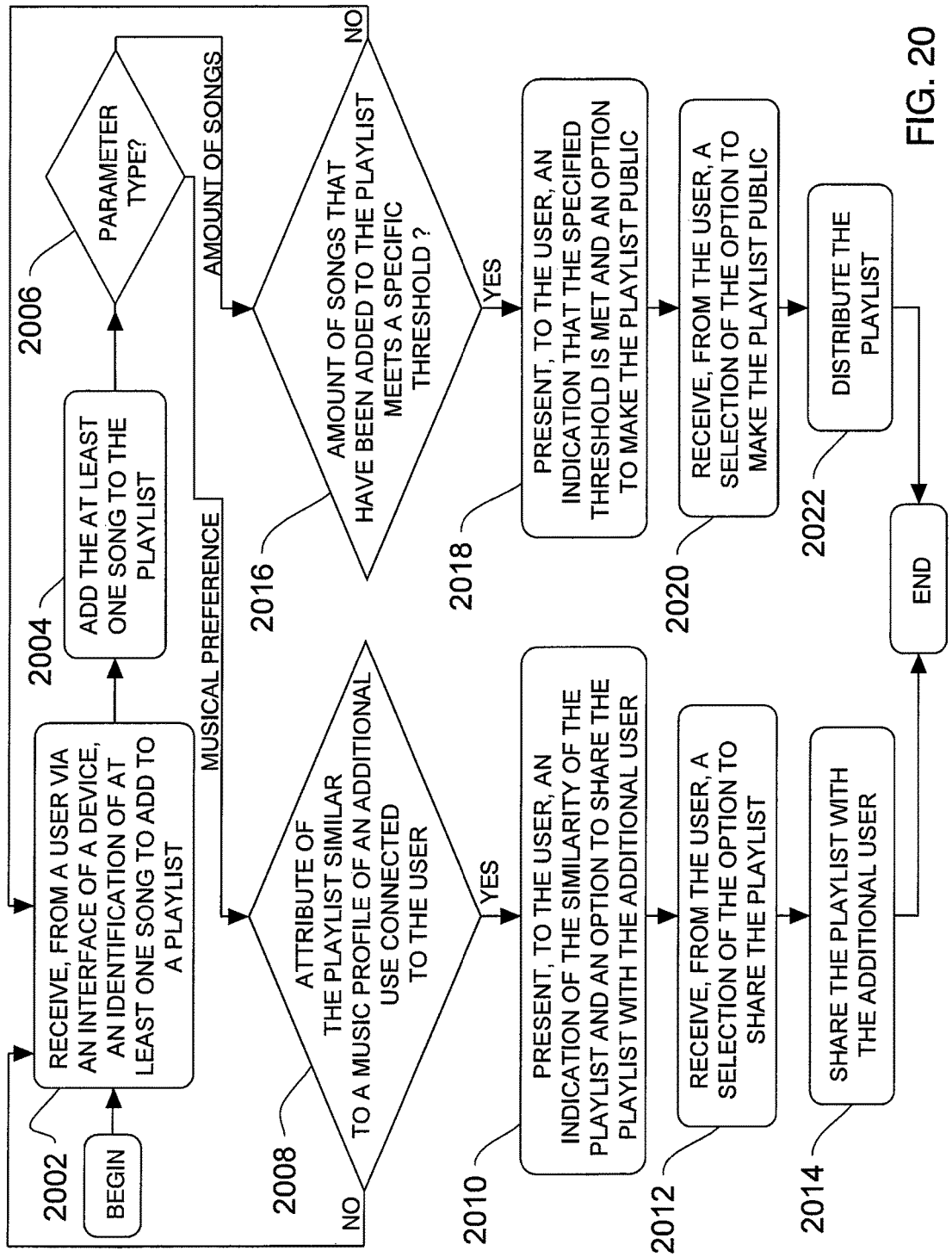
FIG. 20 is a flow diagram depicting playlist distribution techniques, in accordance with embodiments.

FIG. 20 is a flowchart of a method 2000 for a device (such as the device 105) to distribute a playlist after the playlist reaches a specified parameter. It should be appreciated that the functionalities of the method 2000 can be implemented with the device interfacing with a remote server, such as the music service server 115. The method begins when the device receives 2002, from a user via an interface of the device, an identification of at least one song to add to a playlist. For example, the user can browse for songs, receive a song suggestion from another user, and/or perform other actions to select the song.

The device adds 2004 the at least one song to the playlist and examines 2006 a parameter type associated with the playlist. For example, the parameter type can be whether an attribute of the playlist is similar to a music profile (MUSIC PROFILE, 2008) of an additional user connected to the user via the music service. More particularly, the song(s) added to the playlist can be similar to a music profile of the additional user. If the attribute is not similar (NO, 2002), then the device can repeat the receiving and adding functionalities. If the attribute is similar (YES, 2010), then the device presents, to the user, an indication of the similarity of the playlist and an option to share the playlist with the additional user. In some cases, the option can be to distribute the playlist to other users or groups of users of the music service. In embodiments, prior to sharing, the playlist can be private to the user or publicly available. The device receives 2012, from the user, a selection of the option to share the playlist and shares 2014 the playlist with the additional user. More particularly, the device can send an indication of the playlist and the associated songs to the additional user.

The parameter type can also be whether the amount of songs (AMOUNT OF SONGS, 2016) that have been added to the playlist meets a specified threshold. If the amount of songs has not met the specified threshold (NO, 2002), then the device can repeat the receiving and adding functionalities. If the amount of songs has met the specified threshold (YES, 2018), then the device presents, to the user, an indication that the specified parameter is met and an option to make the playlist public. In some cases, the playlist can already be publicly available and the option can be to distribute the playlist to certain user(s) or certain group(s) of users. The device receives 2020, from the user, a selection of the option to make the playlist public and distributes 2022 the playlist accordingly. More particularly, the device, via the music service server, can avail the playlist to more users of the music service.

FIG. 21 is a flowchart of a method 2100 for a device (such as the device 105) to provide an interface for a user to generate a playlist. It should be appreciated that the functionalities of the method 2100 can be implemented with the device interfacing with a remote server, such as the music service server 115. The method begins when the device identifies 2102 at least one property associated with an environment of the device. For example, the at least one property can be a time, a weather condition, a location, and/or other properties. The device presents 2104 an interface to a user of the device, the interface comprising a set of selectable options and an indication of the at least one property. In some cases, the device randomly generates values for the set of selectable options. In other cases, the values for the set of selectable options can be based on the at least one property. Further, the set of selectable options can comprise one of more of a setting, a desired activity, an indication of one or more other users, a music genre, and/or others. More particularly, the location can be determined via a GPS chip of the device and can be a general location (e.g., outside, at a park, downtown, etc.), or can be a specific location or venue (e.g., at a specific school, coffee shop, office building, etc.). Further, the one or more other users can be connected to the user via a music service, as discussed herein.

The device determines 2106 whether there are any modifications to the set of selectable options received from the user. For example, the user can change any of the set of selectable options via the interface, as discussed with respect to FIGS. 4-6 and 8. If there are any modifications (YES, 2108), the device updates at least one of the set of selectable options based on the modifications. For example, the user can select "jogging" as one of the selectable options. Further, for example, the user can select a location or venue in which the user is currently located. If there are not any modifications (NO, 2110) or after the device updates the at least one of the set of selectable options, the device detects an input by the user via the interface to generate the playlist. For example, the user can make the input when he/she is satisfied with the set of values of the set of selectable options. The device generates 2112 the playlist, wherein the playlist comprises a set of songs based on the set of selectable options and optionally the at least one property. More particularly, the device can interface with a server, such as the music service server 115, to identify songs that match the set of selectable options and optionally the at least one property. The device presents 2114 the playlist to the user via the interface. The user can then make selections on the playlist to play one or more of the set of songs.

Although exemplary embodiments of the invention have been described in detail above, those skilled in the art will readily appreciate that many additional modifications may be possible in the exemplary embodiment without materially departing from the novel teachings and advantages of the invention. Accordingly, these and all such modifications are intended to be included within the scope of this invention.

The invention claimed is:

1. A method of distributing a playlist, the method comprising:
   receiving, at an interface of a device, an identification of a song to add to a playlist;
   in response to adding the song to the playlist, analyzing the playlist by a processor of the device to determine whether a number of songs in the playlist exceeds a threshold number of songs;

determining whether the added song has a similarity to at least one additional music profile connected to a profile associated with the device by a music service;

determining a compatibility between the profile associated with the device and the at least one additional music profile; and presenting, at the interface of the device, an indication of the similarity and an option to distribute the playlist.

2. The method of claim 1, further comprising:

receiving, at the interface of the device, a selection of the option to distribute the playlist; and distributing the playlist according to the option in response to receiving the selection.

3. The method of claim 1, wherein the option to distribute the playlist indicates an ability to share the playlist with the at least one additional music profile.

4. The method of claim 1, wherein determining whether the added song has the similarity to the at least one additional music profile is performed after the playlist has been made public.

5. The method of claim 1, wherein the option to distribute the playlist indicates an ability to make the playlist public.

6. The method of claim 1, wherein when the threshold is not exceeded, the method further comprises:

repeating the receiving, the adding, and the analyzing until the threshold is exceeded.

7. An electronic device capable of distributing a playlist, the electronic device comprising:

a display capable of presenting information at the electronic device; and a processor coupled to the display and configured to perform operations comprising:

receiving, at the electronic device, an identification of a song to add to a playlist, in response to adding the song to the playlist, analyzing the playlist to determine whether a number of songs in the playlist exceeds a threshold number of songs, determining whether the added song has a similarity to at least one additional music profile connected to a profile associated with the electronic device by a music service, determining a compatibility between the profile associated with the electronic device and the at least one additional music profile, and presenting, at the interface of the device, an indication of the similarity and an option to distribute the playlist.

8. The electronic device of claim 7, wherein the processor is further configured to perform operations comprising:

receiving, at the interface of the electronic device, a selection of the option to distribute the playlist, and distributing the playlist according to the option in response to receiving the selection.

9. The electronic device of claim 7, wherein the option to distribute the playlist indicates an ability to share the playlist with the at least one additional music profile.

10. The electronic device of claim 7, wherein determining whether the added song has the similarity to the at least one additional music profile is performed after the playlist has been made public.

11. The electronic device of claim 7, wherein the option to distribute the playlist indicates an ability to make the playlist public.

12. The electronic device of claim 7, wherein when the threshold is not exceeded, the processor is further configured to perform operations comprising:

repeating the receiving, the adding, and the analyzing until the threshold is exceeded.

13. A non-transitory computer readable medium comprising computer instructions embodied thereon to cause one or more processors to:

receive, at an interface of a device, an identification of a song to add to a playlist;

in response to adding the song to the playlist, analyze the playlist to determine whether a number of songs in the playlist exceeds a threshold number of songs;

determine whether the added song has a similarity to at least one additional music profile connected to a profile associated with the device by a music service;

determine a compatibility between the profile associated with the device and the at least one additional music profile; and present at the interface of the device, an indication of the similarity and an option to distribute the playlist.

14. The non-transitory computer readable medium of claim 13, further comprising computer instructions embodied thereon to cause the one or more processors to:

receive, at the interface of the device, a selection of the option to distribute the playlist; and distribute the playlist according to the option in response to receiving the selection.

15. The non-transitory computer readable medium of claim 13, wherein the option to distribute the playlist indicates an ability to share the playlist with the at least one additional music profile.

16. The non-transitory computer readable medium of claim 13, wherein the one or more processors determine whether the added song has the similarity to the at least one additional music profile after the playlist has been made public.

17. The non-transitory computer readable medium of claim 13, wherein the option to distribute the playlist indicates an ability to make the playlist public.

18. The non-transitory computer readable medium of claim 13, further comprising computer instructions embodied thereon to cause the one or more processors to:

repeat the receive, the adding, and the analyze until the threshold is exceeded, wherein the repeat is performed in response to the threshold not being exceeded.

* * * * *